United States Patent [19]

Carome

[11] Patent Number: 5,140,155
[45] Date of Patent: Aug. 18, 1992

[54] FIBER OPTIC SENSOR WITH DUAL CONDITION-RESPONSIVE BEAMS

[75] Inventor: Edward F. Carome, Cleveland, Ohio

[73] Assignee: Edjewise Sensor Products, Inc., Cleveland, Ohio

[21] Appl. No.: 599,007

[22] Filed: Oct. 17, 1990

[51] Int. Cl.$^5$ .............................................. H01J 5/16
[52] U.S. Cl. ................... 250/227.21; 324/96; 250/231.1
[58] Field of Search ........... 250/227.21, 231.1, 227.11; 324/96; 73/516 R, 517 R, 800, 705

[56] References Cited

U.S. PATENT DOCUMENTS

| | | | |
|---|---|---|---|
| 3,146,057 | 8/1964 | Rona | 346/108 |
| 3,449,587 | 6/1969 | Barnes | 250/227 |
| 3,961,185 | 6/1976 | Brokenshire et al. | 73/517 R |
| 4,239,963 | 12/1980 | August et al. | 250/231 |
| 4,249,076 | 2/1981 | Bergstrom et al. | 250/227 |
| 4,275,296 | 6/1981 | Adolfsson | 250/227 |
| 4,321,057 | 3/1982 | Buckles | 23/230 |
| 4,345,482 | 8/1982 | Adolfsson et al. | 73/862.59 |
| 4,353,259 | 10/1982 | Schneider, Jr. | 73/653 |
| 4,359,637 | 11/1982 | Perren | 250/227.21 |
| 4,376,390 | 3/1983 | Rines | 73/517 |
| 4,399,099 | 8/1983 | Buckles | 422/58 |
| 4,403,144 | 9/1983 | Strahan | 250/231 |
| 4,446,366 | 5/1984 | Brogardh et al. | 250/227 |
| 4,498,004 | 2/1985 | Adolfsson et al. | 250/227 |
| 4,554,650 | 11/1985 | Brown et al. | 367/154 |
| 4,613,422 | 9/1986 | Lauks | 204/419 |
| 4,687,927 | 8/1987 | Iwamoto et al. | 250/227.21 |
| 4,829,821 | 5/1989 | Carome | 73/516 |
| 5,015,843 | 2/1990 | Seitz et al. | 250/227.21 |

OTHER PUBLICATIONS

An Introduction to Fiberoptic Sensors by C. Davis, Fiberoptic Technology, Feb. 1982, pp. 112-115.
Sensing with Optical Fibers: An Emerging Technology by A. Tebo, Electro-Optical System Design, Feb. 1982, pp. 39-45.
Chemical and Biological Sensors by C. Nylander, J. Phys. E. Sci. Inst. vol. 18, 1985, pp. 736-747.
Optical fibre sensors and systems for industry, by Barry E. Jones, J. Phys. E. Sci. Inst., vol. 18, 1985, pp. 770-781.

*Primary Examiner*—David C. Nelms
*Attorney, Agent, or Firm*—Fay, Sharpe, Beall, Fagan, Minnich & McKee

[57] ABSTRACT

An optical fiber (12) extends from a light source (10) along a beam (16) of a sensor (18). The optical fiber terminates in a free end adjacent a free end of the beam and generally opposite to a fixed free end of a target, such as a second optical fiber (20). Light is transmitted across a gap between the first and second optical fibers in accordance with the degree of alignment thereof. The beam (16) has at least two portions (38, 40) extending longitudinally therealong. Each of the beam portions is constructed of a material that changes longitudinal dimension to a different degree than the other in response to the sensed condition. In this manner, the sensed condition causes the beam to bend, altering the degree of alignment between the optical fiber free ends in response to the sensed condition.

20 Claims, 3 Drawing Sheets

FIBER OPTIC SENSOR WITH DUAL CONDITION-RESPONSIVE BEAMS

BACKGROUND OF THE INVENTION

The present invention relates to sensors for sensing conditions in ambient and controlled environments. The invention is described with particular reference to sensors for sensing electrical fields, magnetic fields, temperature, pH, humidity, and other conditions which have a differential effect on materials.

Heretofore, fiber optic sensors have been utilized to sense a variety of conditions, such as motion. In one prior art motion detector, a pair of light sensors were disposed behind a pair of slits. A lever arm carried an optical fiber to a point closely adjacent and generally between the two slits such that each sensor sensed generally the same amount of light. Under acceleration, the lever arm would bend in proportion to the acceleration moving the lever arm toward one slit and away from the other. This motion changed the relative amount of light sensed by each sensor generally in proportion to the acceleration forces. By comparing the sensor outputs with each other, the device could be calibrated to provide an indication of acceleration.

Other acceleration monitors alter the light transmissive properties of an optical fiber in accordance with the amount of acceleration. The optical fibers were placed relative to a mass such that the mass deformed the optical fiber. For example in some sensors, the mass stretched the optical fiber in accordance with acceleration. In other applications, the mass bent or flexed the optical fiber sufficiently to alter light transmission in accordance with acceleration.

Analogously, fiber optic chemical and biological sensors have been designed in which the light transmissive properties of the optical fiber are altered by the presence of certain chemical substances. For example, the amount of light transmitted through the core of an optical fiber was altered as the cladding layer absorbed one or more selected chemical fluids. Analogously, a cladding was selected whose properties change in response to electromagnetic, electrical, or sonic energy.

As another example, two optical fibers have been arranged end to end with a gap therebetween. A structure, such as a grating or a shutter, which moves in response to a sensed condition, was positioned in the gap. For example, the shutter snapped between blocking and retracted positions in response to a sensed condition. Alternately, a multiple grating moved in proportion to a sensed condition, such a pressure, to adjust the degree of light transmission analogously.

The prior art sensors, particularly those that mechanically deform the optical fiber to alter the light passage therethrough, tend to be relatively expensive to manufacture. The small sizes and critical tolerances compound manufacturing difficulties.

The present invention contemplates a new and improved sensor that is simple to manufacture and amenable to automated manufacturing procedures.

SUMMARY OF THE INVENTION

In accordance with the present invention, a sensor is provided in which an optical fiber extends along a beam member. The beam member has at least two longitudinally extended portions. Each of the beam member portions undergoes a different physical change, preferably longitudinal elongation or contraction, in response to the sensed condition. In this manner, the differential mechanical elongation and contraction of the two longitudinal portions causes the beam to bend.

In accordance with a first embodiment of the present invention, the portions may both be made of piezoelectric, magnetostrictive, thermally extending, or like materials in which each portion is constructed of a material that expands or contracts to a different degree in response to the same amplitude of the sensed condition. One of the portions may also be constructed of a material that extends longitudinally in response to the presence of a pre-selected chemical substance.

In accordance with another aspect of the first embodiment of the present invention, the beam may be constructed of a combination of the above materials or multiple beams constructed of the different materials may function together to sense a plurality of the above-referenced properties or to compensate for the first and second portions inherently having different magnetostrictive, thermally expansive, piezoelectric properties, vibration or acceleration, and the like.

In a second embodiment, a sensor is provided in which a first optical fiber extends along either a second beam member or along a rigid fixed member. Each beam member undergoes a different physical change in response to the sensed condition causing the beam to bend and to change the amount of light coupled from the first optical fiber to the second optical fiber.

One advantage of the present invention resides in its simplicity of manufacture.

Another advantage of the present invention is that it is amenable to automated mass manufacturing techniques.

Another advantage of the present invention is that it accurately measures a variety of conditions.

Still other advantages will become apparent on reading and understanding the following detailed description.

BRIEF DESCRIPTION OF THE DRAWINGS

The invention may take form in various parts and arrangements of parts, or in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
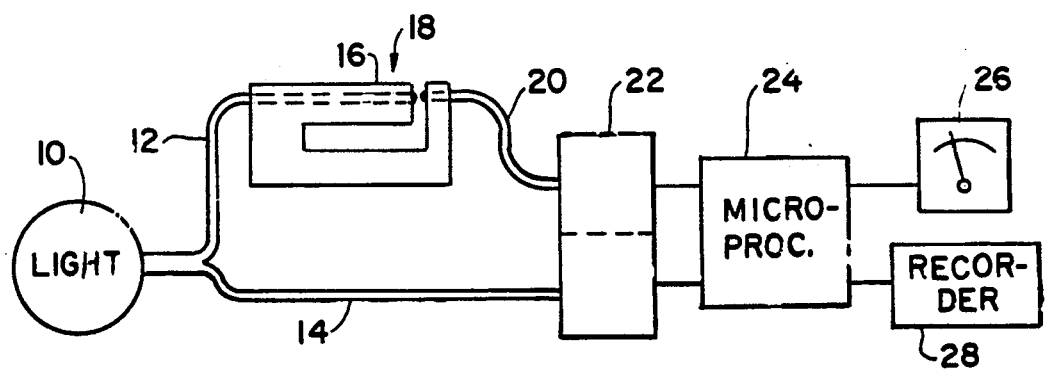
FIG. 1 illustrates a diagrammatic illustration of a condition sensing system in accordance with the present invention.

With reference to FIG. 1, a light source 10 projects light through a first optical fiber 12 and a second optical fiber 14. The first optical fiber passes longitudinally through a bimorphic cantilever beam member 16 of a sensor 18. The beam member is configured to bend or deflect in response to the sensed condition. A light sensitive means, such as third optical fiber 20, causes an output light signal whose magnitude varies with beam deflection.

The optical fiber 20 and reference optical fiber 14 are connected with an opto-electric intensity detecting means 22. More specifically, the intensity detecting means detects changes in the intensity of light transmitted through optical fiber 20. The intensity of light transmitted through optical fiber 14 is used as a reference to guarantee the changes of intensity are due to changes in the alignment of the optical fibers 12, 20 rather than due to intensity variation in the light emitted from the source 10.

A microprocessor 24 receives signals indicative of the intensity of light transmitted through optical fiber 20 or differences in the relative intensity between the light transmitted through optical fibers 14 and 20. The microprocessor compares these intensities with a previously calculated table of intensities versus strength of the sensed condition. Preferably, the table is iteratively determined by placing the sensor 18 in each of a range of intensities of the sensed condition and programming the table in accordance therewith.

The signal indicative of the strength of the sensed condition is conveyed to a man readable display 26 for providing man readable indication of the strength or the property of the sensed condition, to a recording means 28, or the like. It is also to be appreciated that the output need not vary continuously with the intensity of the sensed condition. Rather, the output of the microprocessor may have only one of two states, e.g. whether the monitored condition exceeds a pre-selected level. For example, in a fire detector, the system need only indicate when the temperature exceeds the normal temperature by a sufficient pre-selected number of degrees such that the presence of a fire is indicated. The man readable display may include a bell or other audio alarm. As another example, the lever arm may bend in response to a liquid. To detect fluid leaks, the microprocessor only determines when the change of intensity exceeds a pre-selected threshold of a leak. The microprocessor may monitor the intensity repeatedly over a pre-selected duration before the alarm is triggered. This would eliminate short-term instantaneous changes in intensity such as might be caused by vibration source intensity fluctuations or the like. As yet another example, the lever arm may bend in proportion to a sensed magnetic field or the magnetic fields surrounding current flow. Frequency of AC current can be determined from the frequency of light modulation. AC or DC current amplitude can be ascertained from the amplitude of the light intensity change.

Figure 2:
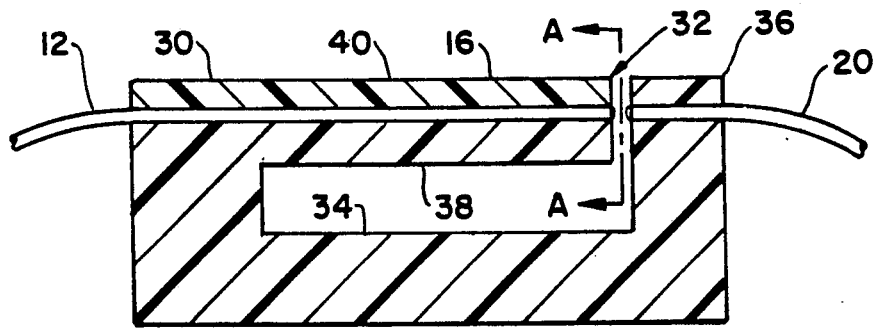
FIG. 2 is an enlarged view of the sensor unit of FIG. 1.
Figure 3A:
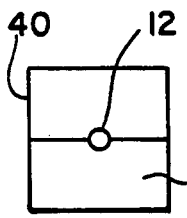
FIGS. 3A, 3B, 3C and 3D are transverse sectional views of four embodiments through section A—A of the beam of FIG. 2.
Figure 3B:
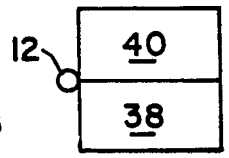
Figure 3C:
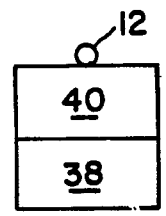
Figure 3D:
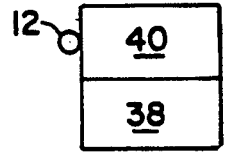

With reference to FIGS. 2 and 3A, the beam member 16 extends longitudinally between a first or fixed end 30 and a second or free end 32. A sensor base 34 extends between the fixed end 30 and a support 36 for supporting an end of the third fiber 20 adjacent the beam free end. The bimorphic beam member 16 has a first longitudinal portion 38 and a second longitudinal portion 40. In the embodiment of FIG. 3A, the two longitudinal beam portions are bimorphic, i.e. constructed of different materials or materials with different properties. The bimorphic portions of the illustrated embodiment are arranged symmetrically to the top and bottom sides of the optical fiber 12. As illustrated in FIGS. 3B-D, the fiber may also be mounted symmetrically or asymmetrically on the exterior of the beam.

Figure 4:
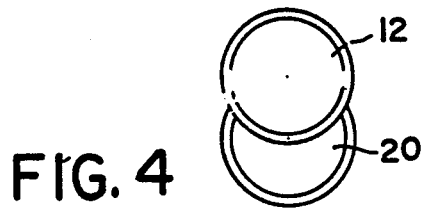
FIG. 4 illustrates how light transmissivity of the sensor is changed in response to the sensed condition.

With continuing reference to FIG. 2 and further reference to FIG. 4, the beam is constructed such that the ends of the optical fiber 12 and optical fiber 20 are displaced approximately half way from one another in a neutral condition. As the beam flexes, the ends of the optical fiber move progressively either more or less out of alignment. The first and second portions 38 and 40 are constructed of materials which extend differently in response to a selected condition and preferably respond the same to other conditions present. The exact materials are selected in accordance with the condition to be sensed.

In one embodiment, the first and second longitudinal portions are constructed of materials with different piezoelectric values. In a preferred embodiment, the first portion 38 is constructed of a piezoelectric material which extends along the length of the beam in proportion to the strength of a sensed electric field. The second longitudinal beam portion 40 has a different piezoelectric property, preferably opposite to 38 so that it contracts along the length of the beam due to the same sensed electric field. In this manner, in the presence of an electric field of the particular polarity, the first beam portion 38 extends longitudinally relative to the second beam portion 40 causing the beam to arc downward and the ends of optical fibers 12 and 20 to become more misaligned. The greater the strength of the electrical field, the greater the arcing, and hence the greater the degree of the misalignment. If the electric field is reversed in polarity portion 38 will contract and 40 will extend causing the beam to arc upward and the ends of optical fibers 12 and 20 to become less misaligned, i.e. more aligned. Optionally, the beam and upper base portions may be encased in a damping elastomer or fluid to limit or control beam vibration.

When magnetic fields are to be sensed, the two longitudinal beam portions have different magnetostrictive properties. For example, the first longitudinal beam portion is constructed of a magnetostrictive material such as an amorphous metal alloy, e.g. METGLAS. The second longitudinal beam portion is constructed of a non-magnetostrictive material which bonds to the first such as a plastic, glass, or non-ferrous metallic material.

As yet another alternative, the first and second longitudinally extensive beam portions have different coefficients of thermal expansion. For example, one is stainless steel and the other INVAR. Numerous other plastic, metal, glass, and other materials or combinations thereof which have different indices of thermal expansion or contraction may be utilized.

As still another example, the first and second beam portions may have different sensitivity to chemical substances. For example, one is constructed of a material which readily absorbs fluid materials and expands longitudinally; whereas, the other portion is relatively insensitive to fluid materials and undergo a lesser degree of longitudinal expansion. Numerous plastic materials have different degrees of fluid absorptivity and corresponding physical size elongation. As yet another option, the materials can change the length in response to other chemical conditions, such as pH, the presence of volatile hydrocarbons, and the like, may be utilized.

The sensor can also be a one use sensor in which one portion irreversibly changes dimensions in response to the sensed condition. For example, one of the portions reacts chemically with a selected fluid or class of fluids. As another example, one of the portions dissolves or deteriorates. The other portion is constructed with a natural bias that is released by the dissolving, deteriorating, or delaminating of the other portion.

Figure 5:
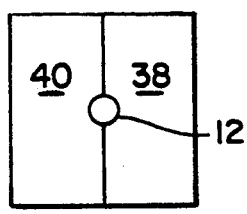
FIGS. 5, 6, 7, 8 and 9 are sectional views through section A—A of the beam of alternate embodiments of the present invention.

It is to be appreciated that numerous other cross-sections of the beam 16 and shapes of the first and second portions 38 and 40 achieve analogous results. In the embodiment of FIG. 5, the beam does not bend up and down. Rather, the first and second longitudinal portions are placed side by side such that the beam bends to the side. By altering the interface between these two portions, bending along various other directions can also be achieved.

Figure 6:
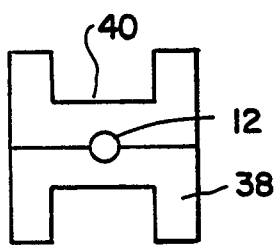

With reference to FIG. 6, various cross-sections can be utilized to increase the relative rigidity of the non-length changing member relative to the length changing member, hence the amount of bending. In the embodiment, the rigid first portion 38 softens or otherwise loses strength and the second portion is a spring member that is held against the spring bias by the first portion.

Figure 7:
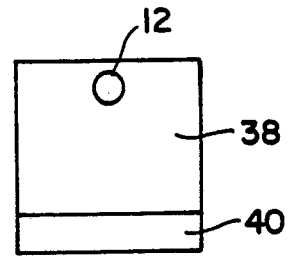
Figure 8:
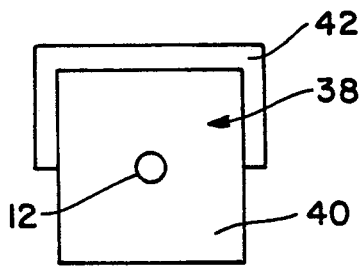

With reference to FIG. 7, it is to be appreciated that the two portions need not be symmetric. Rather, one may be significantly larger than the other. Moreover, the optical fiber may be mounted in or on only one of the portions. With reference to FIG. 8, the first and second portions may be constructed of a unitary homogeneous material. The two portions in FIG. 8 are differentiated by an appropriate coating 42 over one portion of the beam. Looking for example to the embodiment in which the beam flexes in response to the presence of a fluid, sections 38 and 40 may both be constructed of a material which expands longitudinally as fluid is absorbed. The coating 42 is fluid impermeable to prevent section 38 from absorbing fluid. Analogous coatings may be utilized when sensing other conditions. For example, a ferrous coating 42 may be applied over one longitudinal portion of a magnetostrictive beam to shield the one portion from magnetic fields which freely permeate the other portion.

Figure 9:
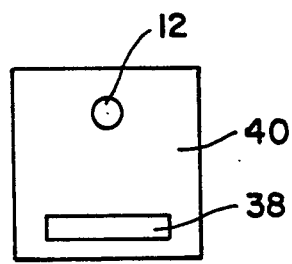

With reference to FIG. 9, one of the portions 38 may be completely embedded in the other portion 40. The embedded portion may be a material that is non-extensive or contractive in response to the sensed condition; whereas, the remainder of the beam expands or contracts. Alternately, the portion 40 which constitutes the majority of the beam may be insensitive to the sensed condition; whereas the first, encased portion 38 extends or contracts in response to the sensed condition. The optical fiber itself can be the non-dimension-changing portion mounted off-center in the dimension-changing portion. Numerous other cross-sections which cause the degree of overlap of the optical fiber 12 to change relative to optical fiber 20 in response to the sensed condition are also contemplated.

Figure 10:
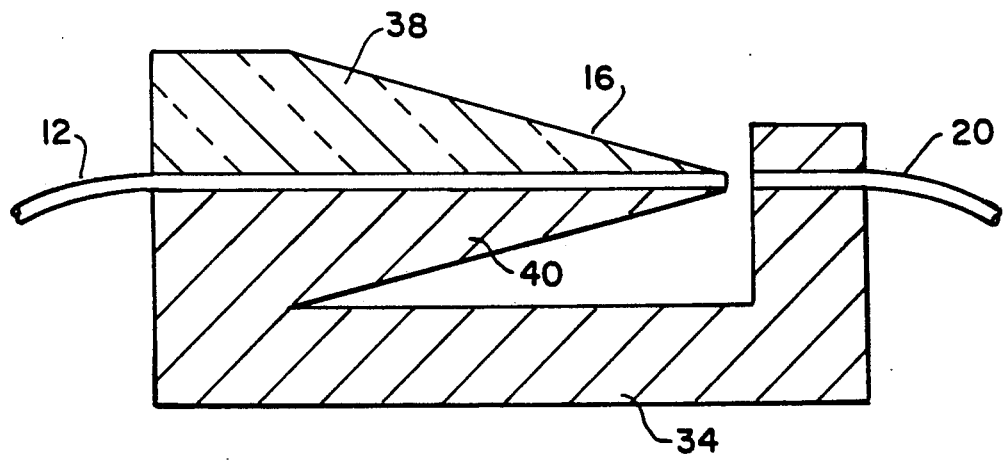
FIG. 10 is a side view of an alternate embodiment of the sensor of FIG. 2 which is less sensitive to acceleration.

With reference to FIG. 10, it is to be appreciated that the beam may have different cross-sections longitudinally. For example, the long cantilevered beam 16 of FIG. 2 may be relatively sensitive to vibration. FIG. 10 illustrates a beam which is more insensitive to vibration than that of FIG. 2. Thinner areas towards the point may change longitudinal dimension more or less rapidly than thicker portions towards the rear; whereas, the thicker portions may change dimensions over a larger range of intensities of the sensed condition. By appropriately varying the cross-section and thickness of the beam, the linearity or non-linearity of the relationship between the strength of the sensed condition and the output is selectively adjusted.

Figure 11:
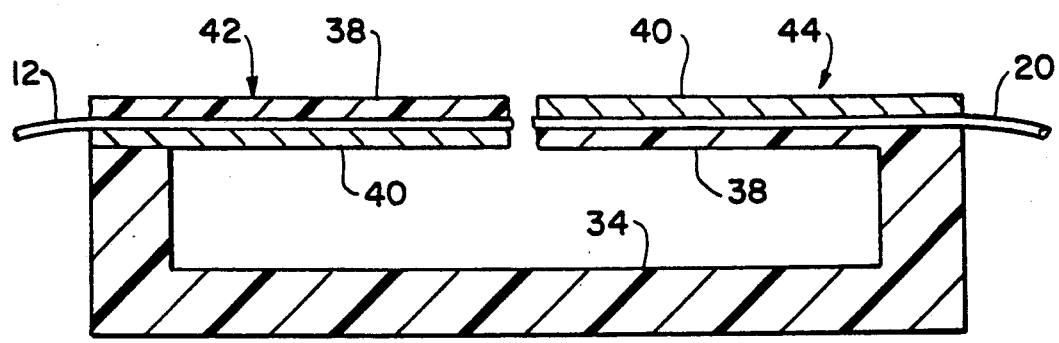
FIG. 11 is a side view of another alternate embodiment of the sensor of FIG. 2 which is less sensitive to acceleration.

With reference to FIG. 11, it also is to be appreciated that two beam members may be used. By reversing the portions 38 and 40 in the two beams 42 and 44, the beams will bend oppositely in response to a selected condition and they preferably respond the same to other conditions present. For example, undervibration, both beams in the configuration shown in FIG. 11 will bend in the same direction so that it will be more insensitive to vibration than that of FIG. 2.

Many materials have sufficient piezoelectric, magnetostrictive, thermally expansive, chemically expansive and contractive, or like properties, as to be functional in sensing several conditions. More commonly, the difficulty arises in trying to ascertain two materials whose dimension changing properties are the same in response to all but the one condition to be sensed. For example, when the first and second beam portions are constructed with materials with two different piezoelectric properties, the materials may also have different coefficients of thermal expansion. This renders the sensor sensitive not only to electrical fields but also to temperature. Analogously, materials with different magnetostrictive properties may also have different coefficients of thermal expansion, piezoelectric properties, and the like.

Figure 12:
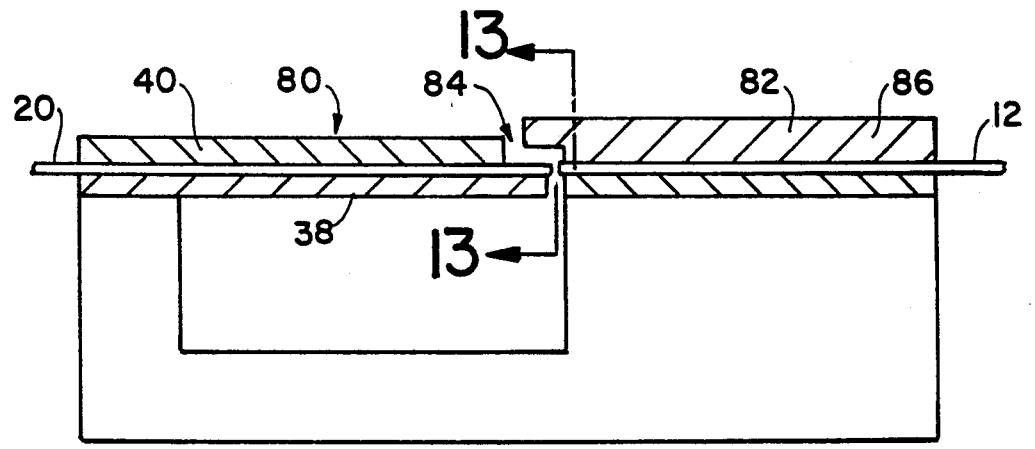
FIG. 12 is a side view in partial section of another alternate embodiment.
Figure 13:
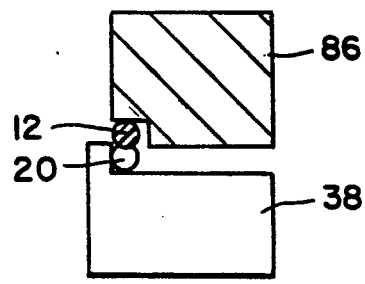
FIG. 13 is a sectional view through section 13—13 of FIG. 12.

With reference to FIGS. 12 and 13, to sense magnetic fields, for example, a beam so is a bimorph of a magnetic material 38 such as METGLAS and a non-magnetic material 40 such as brass. A second rigidly mounted magnetic material 83 is positioned so that there is a small gap 84 between the METGLAS portion 38 of the beam 80 and a METGLAS portion 86 of the rigidly mounted magnetic material 82. When a magnetic field B is applied longitudinally along the beam an attractive force is produced between the magnetic portions 38 and 86 and the beam 80 deforms to reduce the gap 84 between the beam so and the rigid magnetic material 82.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A sensor comprising:
    a first beam which has a free end and is supported adjacent an opposite end, the first beam including at least two longitudinally extending portions, each portion having different longitudinal dimension changing properties responsive to a sensed condition, whereby the sensed condition causes a differential dimension change moving the first beam free end in response to the sensed condition;
    a second beam which has a free end and a supported end, the second beam including at least two longitudinally extending portions, each portion of the second beam having different longitudinal dimension changing properties;

an optical fiber extending along one of the first and second beams and terminating adjacent the free end thereof in an optical fiber free end;

a target mans supported by the other of the first and second beam free ends adjacent and generally opposite the optical fiber free end, whereby relative movement of the first and second beam free ends in response to the sensed condition changes optical transmission properties between the optical fiber free end and the target means.

2. The sensor as set forth in claim 1 wherein one of the longitudinal portions of one of the first and second beams has different piezoelectric properties than the other longitudinal portion of the one of the first and second beams, such that the one longitudinal beam portion changes longitudinal dimension differently from the other longitudinal beam portion in the presence of an electrical field.

3. The sensor as set forth in claim 1 wherein one of the longitudinal portions of one of the first and second beams has different magnetostrictive properties than the other longitudinal portion of the one of the first and second beams such that the one longitudinal portion changes dimension differently from the other longitudinal portion in the presence of a magnetic field.

4. The sensor as set forth in claim 1 wherein one of the longitudinal portions of one of the first and second beams has a different thermal coefficient of expansion than the other longitudinal portion of the one of the first and second beams such that the one longitudinal portion changes dimension differently from the other longitudinal portion in response to temperature changes.

5. The sensor as set forth in claim 1 wherein one of the longitudinal portions of one of the first and second beams changes in dimension differently than the other longitudinal portion of the one of the first and second beams in response to contacting fluids.

6. The sensor as set forth in claim 1 wherein one of the longitudinal portions of one of the first and second beams has different chemically reactive properties from the other longitudinal portion of the one of the first and second beams.

7. The sensor as set forth in claim 1 wherein the target means includes an end of a second length of optical fiber such that relative movement of the first and second beam free ends alters the amount of light transmitted between the optical fibers.

8. The sensor as set forth in claim 1 wherein the optical fiber is connected with a source of light and the target means is connected with a light intensity measuring means which produces an electrical signal indicative of variations in an intensity of received light, whereby changes in received intensity are indicative of relative movement of the first and second beam free ends.

9. The sensor as set forth in claim 1 wherein the target means includes a mirror.

10. The sensor as set forth in claim 1 wherein the optical fiber is embedded longitudinally along the first beam and wherein the first beam at least two longitudinally extending portions include two elongated strips connected together adjacent the optical fiber.

11. The sensor as set forth in claim 1 wherein the optical fiber is mounted to an exterior surface of the first beam.

12. The sensor as set forth in claim 1 wherein the at least two longitudinally extending portions of at least one of the first and second beams are constructed of the same material and further including a covering means for covering one of the longitudinal portions of said at least one of the first and second beams to shield the one longitudinally extending portion from the sensed condition.

13. A sensor comprising:

a base;

a first supporting means mounted on the base for supporting a supporting end of a first beam, the first beam having a free end;

an optical fiber extending along the first beam and terminating in a free end adjacent the first beam free end;

a second supporting means mounted on the base for supporting a supporting end of a second beam, the second beam having a free end;

a light receiving means disposed generally opposite the optical fiber free end connected with the second beam free end;

the first beam including first and second elongated portions, the first and second elongated portions having different indices of expansion along the length of the first beam in response to a sensed condition;

the second beam has first and second longitudinally extending elongated portions, the first and second elongated portions having different indices of expansion along the length of the second beam in response to the sensed condition and being arranged such that a free end of the second beam moves in an opposite direction than the first beam free end in response to the sensed condition, whereby the sensed condition causes relative movement of the first and second beam free ends altering light communication between the optical fiber free end and the light receiving means.

14. The sensor as set forth in claim 13 wherein the light receiving means is a free end of at least one length of optical fiber.

15. A sensor system comprising:

a source of light;

a first beam member having at least two elongated portions, the first beam member being supported adjacent one end and having a free end, the two elongated portions changing dimensions differently in response to sensed conditions such that the beam member flexes moving the free end;

a second beam member having at least two elongated portions that change dimension differently in response to sensed conditions, the second beam member being supported adjacent one end and having a free end, the first and second beam member free ends defining a gap therebetween;

an optical fiber means for transmitting light from the light source to the first beam member free end;

an intensity detector for detecting light which has been transmitted across the gap from the first beam member free end to the second beam member free end and providing an output signal indicative of the light transmitted across the gap from the first beam member free end to the second beam member free end.

16. The sensor system as set forth in claim 15 wherein the at least two elongated portions of the first beam member change dimensions differently than the at least two elongated portions of the second beam member in response to the same sensed conditions and further including a processor means connected with the intensity detector for isolating one of the sensed conditions from the flexing of the first and second beam members.

17. The sensor system as set forth in claim 15 wherein the optical fiber means includes an optical fiber free end mounted to the first beam free end and further including a light receiving means mounted to the second beam member free end across the gap from the optical fiber free end.

18. The sensor as set forth in claim 15 further including a damping fluid encasing the first and second beam members to control vibration thereof.

19. The sensor as set forth in claim 15 wherein the optical fiber means includes an optical fiber embedded in and extending longitudinally along the first beam member.

20. A sensor for sensing electromagnetic fields, the sensor comprising:
   a first bimorphic beam member that is fixed adjacent a first end and has a second end that is free to move, the first bimorphic beam member including two longitudinally extending portions, the two longitudinally extending portions changing dimensions differently in the presence of the electromagnetic fields such that changing dimensions differently causes the first beam member to bend moving the first beam member second end;
   a second beam member that is fixed adjacent a first end and has a second end that is free to move, the first and second beam members being disposed in longitudinal alignment defining a gap between the first beam member second end and the second beam member second end, the first and second beam member having common inertial properties such that the first and second beam members vibrate together with the first beam member second end and the second beam member second end remaining in alignment during vibration;
   an optical fiber having a light emitting portion for transmitting light therefrom;
   a target means for receiving the transmitted light;
   one of the optical fiber light emitting portion and the target means being mounted adjacent the first beam member second end and the other being mounted adjacent the second beam member second end across the gap therefrom, such that an intensity of light transferred between the optical fiber light emitting portion and the target means is indicative of the electromagnetic field strength and is isolated from vibration.

* * * * *